United States Patent [19]

Basinsky et al.

[11] Patent Number: 4,638,971
[45] Date of Patent: Jan. 27, 1987

[54] MACHINERY SKID

[75] Inventors: Michael J. Basinsky, Broken Arrow; Dale T. Bird, Bristow; Daniel W. Smith, Tulsa, all of Okla.

[73] Assignee: Dowell Schlumberger Incorporated, Tulsa, Okla.

[21] Appl. No.: 825,824

[22] Filed: Feb. 4, 1986

[51] Int. Cl.⁴ ............................................. F16M 3/00
[52] U.S. Cl. .................................. 248/678; 108/55.1; 248/676; 366/16
[58] Field of Search ............... 248/678, 679, 637, 639, 248/676; 193/41; 366/16, 17, 18, 19, 21; 108/55.1, 64

[56] References Cited

U.S. PATENT DOCUMENTS

| | | | |
|---|---|---|---|
| 1,551,551 | 9/1925 | French | 248/678 X |
| 1,970,705 | 8/1934 | Montigney | 248/678 X |
| 4,158,510 | 6/1979 | Smith et al. | 366/16 |
| 4,347,794 | 9/1982 | Nordstrom | 108/55.1 |

Primary Examiner—Ramon O. Ramirez
Attorney, Agent, or Firm—L. Wayne White

[57] ABSTRACT

A modular skid frame for supporting cement pumping equipment includes three interlockable sections which, when assembled, define two longitudinal support members and a plurality of transverse support members. One end of the skid formed by one of the interlockable sections is adapted to break down into two lateral subsections. A sleeve-like interfit is provided between joined members and bolt and bracket means are provided to disengageably secure adjacent endwise aligned support members together. The pumping equipment is arranged to maximize maintainability and transportability by positioning one engine on each lateral subsection at one end of the skid and having one pump on each of the other two interlockable sections. A displacement tank is supported on the skid above the pumps. The skid and equipment can be particularly adapted to operate with numerous kinds of off-skid mixing equipment.

20 Claims, 8 Drawing Figures

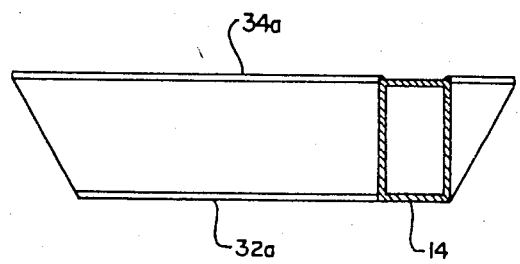
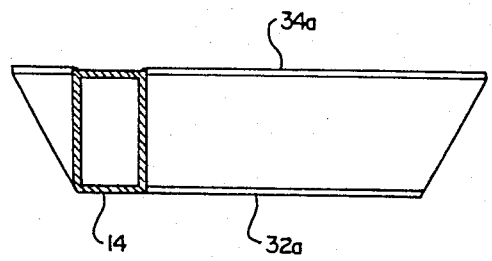
FIG.2
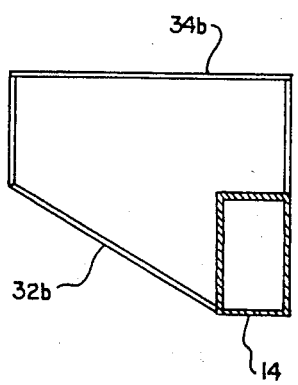
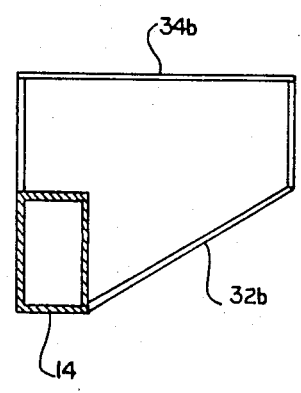
FIG.3
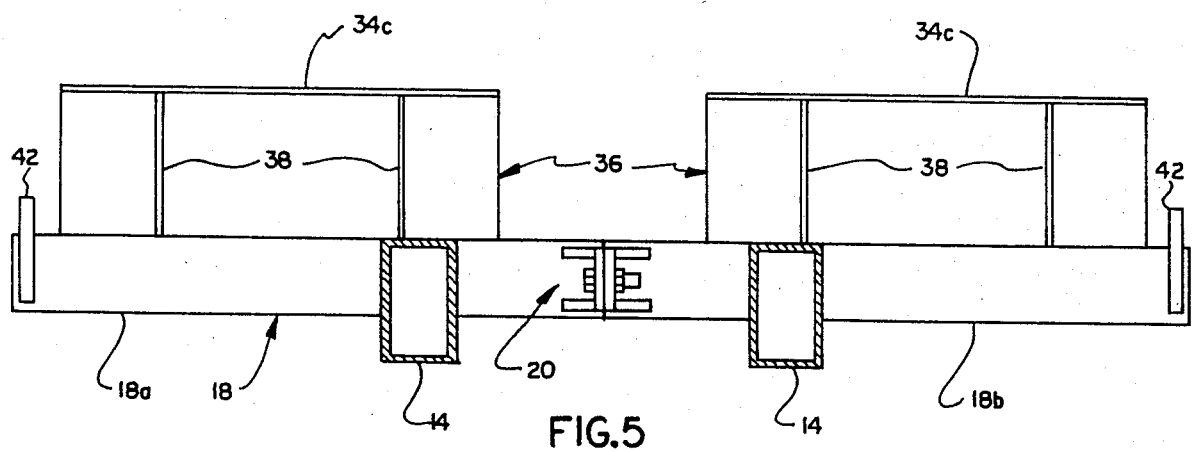
FIG.5

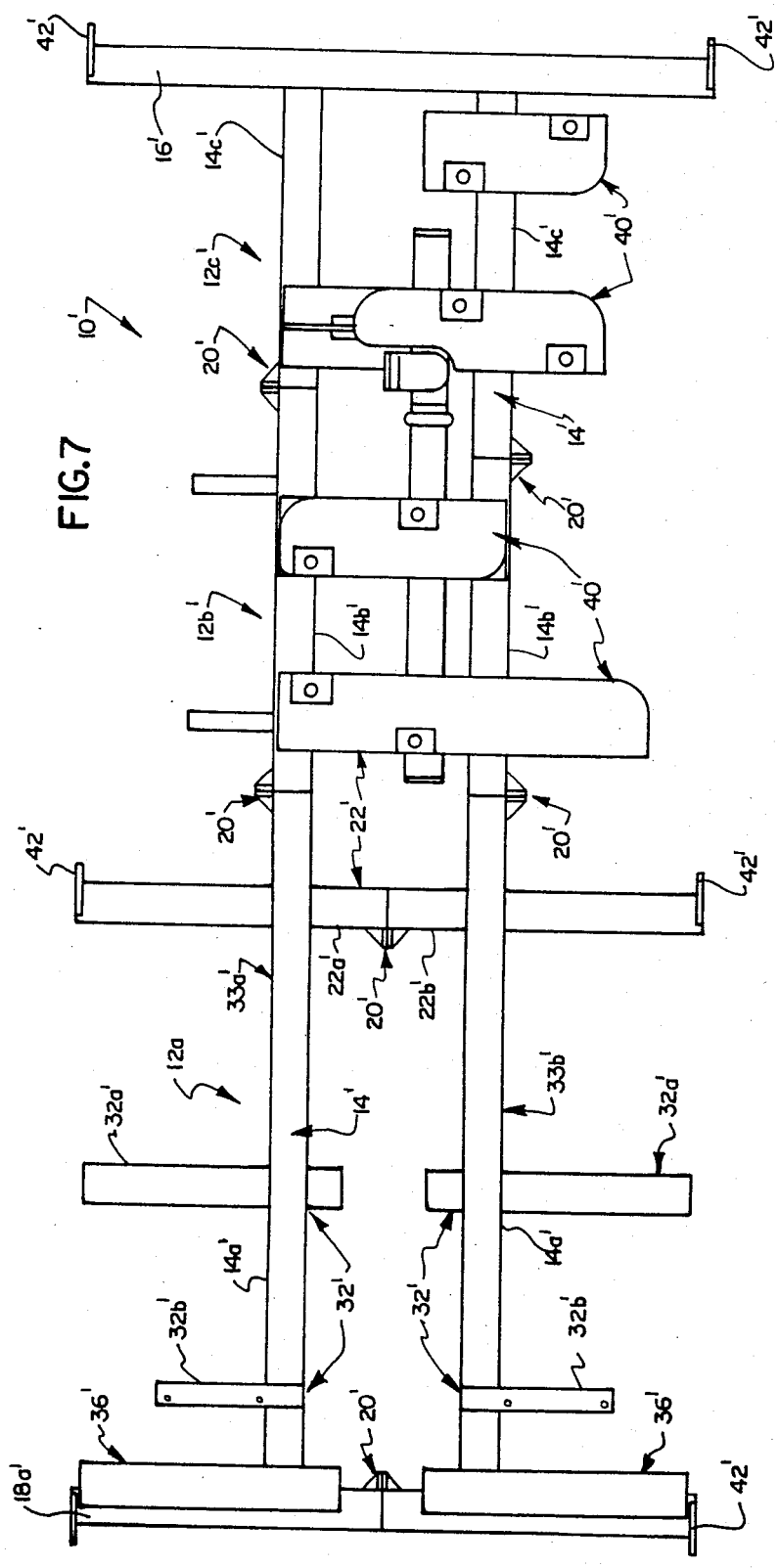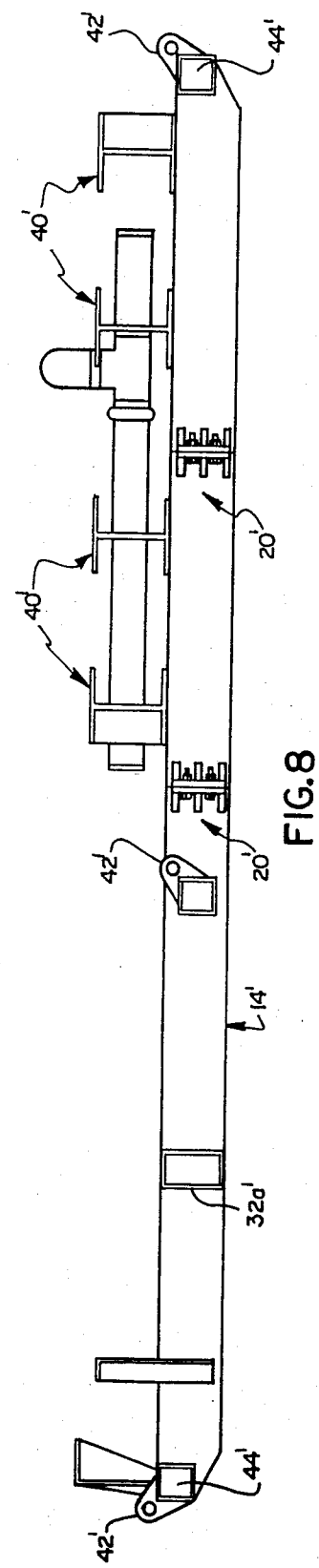

MACHINERY SKID

BACKGROUND OF THE INVENTION

1. Technical Field

The invention relates generally to mounting skids for machinery such as engines, tanks and pumps. More specifically, the invention relates to a modular skid assembly particularly adapted for equipment used for pumping cement slurries and other well treatment fluids.

2. Description of Related Art

Many kinds of machinery skids have been developed over the years for supporting related machinery components. A principal feature of such skids has been a modular or sectional construction which permits the skid to be broken down (disassembled) into a plurality of longitudinal sections for easy transportation of relocation. Originally, skids were constructed with longitudinal support members around and along the perimeter of the skid, which made maintenance of the machinery difficult. More recently, skids have been designed with longitudinal support members located inboard so that much of the machinery is accessible without interference from the skid itself. One such type of skid is described in U.S. Pat. No. 4,158,510 issued to Smith et al.

The prior known skids have substantial drawbacks which limit and diminish their overall utility and efficiency. One problem is that several major pieces of machinery, such as engines or pumps, are constructed on a common longitudinal section of the skid. Repair efforts on such skids are hampered because of the close proximity of numerous pieces of other hardware which limit accessibility. Thus, the entire skid must usually be disassembled and a substantial amount of hardware removed even though only one piece of machinery needs repair or replacement. While these skids can be broken down into longitudinal sections, the sections remain substantial in size and weight and difficult to separate because of the substantial number of bolts or similar means for holding the overall skid frame together. These difficulties substantially increase the time and labor required to assemble, disassemble, and use the prior known skids, which, in turn, increase costs and decrease efficiency.

SUMMARY OF THE INVENTION

The present invention overcomes the abovementioned problems in the prior art by providing a machinery skid which can be easily assembled and disassembled with a minimal number of parts and which breaks down into convenient subsections. One aspect of the invention broadly contemplates a modular skid design particularly suited for use with oil field pumping equipment and similar apparatus. The modular skid comprises a plurality of longitudinally interlocking sections or subsections adapted to support certain pieces of the machinery. The interlocking sections are easily transportable to land-based and offshore operating sites.

Another aspect of the invention is a modular skid which includes both longitudinally and laterally separable subsections which permit removal of a portion of the skid without breaking down and disassembling the entire portion of the skid. The skid subsections each support only one engine and transmission so that the size and weight of the subsection are substantially reduced, thus facilitating handling, transportation and repair of the machinery. The engine-support end of the skid has no inner cross pieces which meet so that, when assembled, the skid is designed to support an operator's platform which is, in part, located above the transmission, thus facilitating repair of the engines and improving operator efficiency.

A still further aspect of the invention is a modular skid frame which has an interlocking design to permit assembly and disassembly of the skid with a minimal amount of hardware, such as bolts, thus reducing the time, labor and costs associated with the manufacture and use of the skid.

These and other aspects of the invention will be more fully described and understood in the following specification in view of the accompanying drawings.

BRIEF DESCRIPTION OF THE DRAWINGS

FIG. 2 is a sectional view of the skid shown in FIG. 1 taken along line 2—2, the background having been omitted for clarity;

FIG. 3 is a sectional view of the skid taken along line 3—3, of FIG. 1 the background having been omitted for clarity;

FIG. 4 is a left side elevation of the skid as viewed in FIG. 1;

FIG. 5 is a sectional view of the skid shown in FIG. 1 taken along line 5—5;

FIG. 7 is a plan view of another embodiment of the present invention; and

FIG. 8 is a side elevation of the skid shown in FIG. 7.

DESCRIPTION OF THE PREFERRED EMBODIMENT

Figure 1:
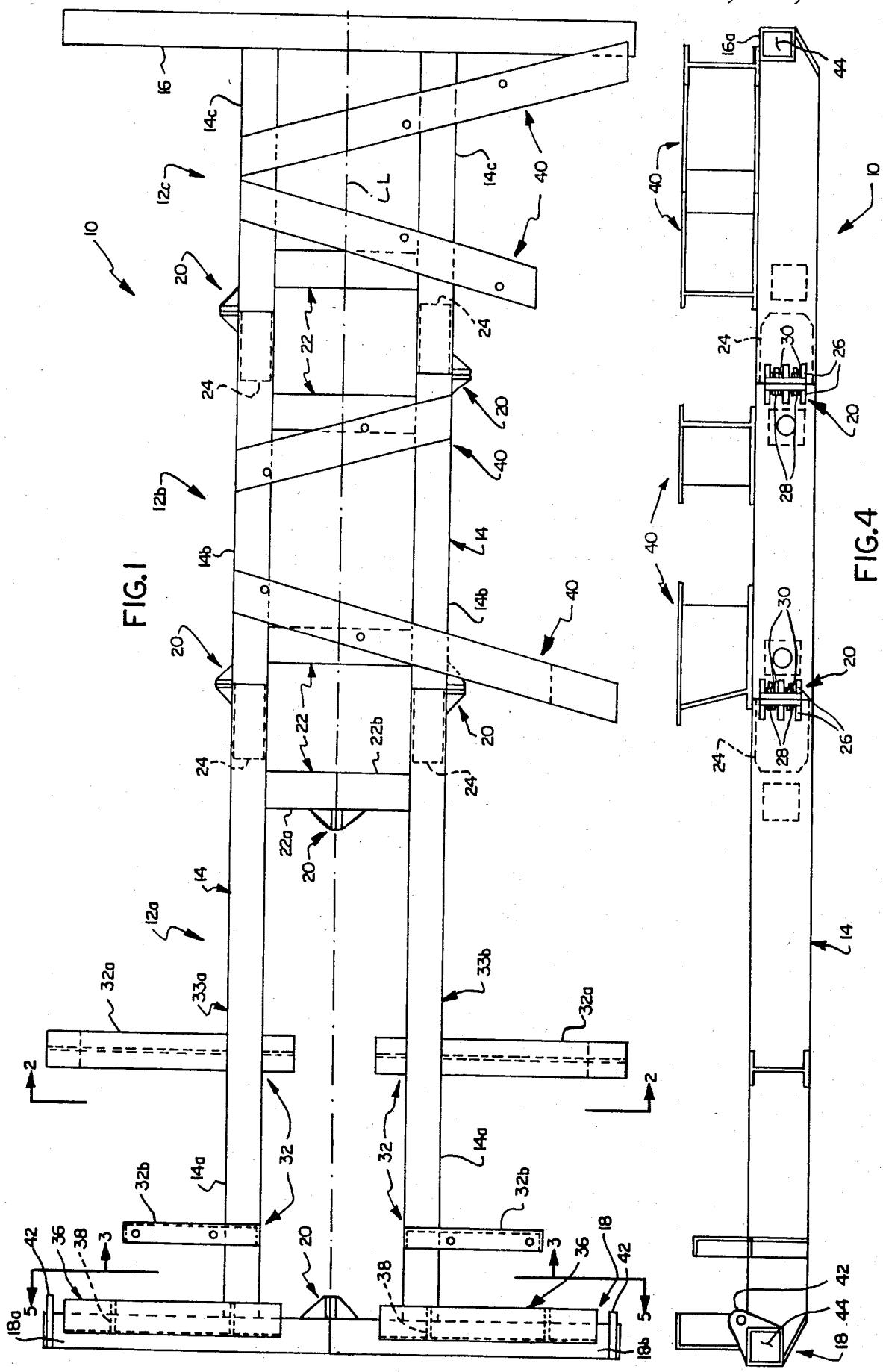
FIG. 1 is a plan view of a modular skid frame according to the present invention.

A modular skid frame adapted to support machinery, such as oil field pumping equipment and like apparatus, is generally indicated by the numeral 10 in FIGS. 1–6. As best shown in FIG. 1, the skid 10 comprises a plurality of interlockable sections 12; the drawings illustrate a typical skid according to the invention having three interlockable sections 12a, 12b and 12c, although a different number of sections can be utilized. Furthermore, at least one end of the skid 10, which is formed by a forward section 12a as illustrated and viewed in FIG. 1, is composed of two subsections which are laterally and separably joined together, as will be more fully described hereinafter.

When assembled as illustrated, the modular frame 10 has two relatively closely spaced and generally parallel longitudinal support members 14. In use, the longitudinal support members 14 lie in a common and generally horizontal plane on a supporting foundation (not shown), such as a rig deck, platform, ground or the like. As shown in FIGS. 2 and 3, the longitudinal members 14 are preferably rectangular tubes in section along their entire length.

A unitary transverse support end-member 16 is attached to corresponding ends of the longitudinal support members 14 at a rear end of the skid 10 (as viewed in FIG. 1). As shown in FIG. 4, the transverse member 16 is square in section and has an upper side 16a flush with the upper surfaces of the longitudinal members, and thus the transverse member 16 is somewhat elevated above the foundation F on which the skid 10 will rest. As illustrated, the transverse member 16 substantially extends outboard from the outer sides of the longitudinal members 14.

At the forward end of the skid 10, opposite the transverse member 16, two transverse support end-members 18a and 18b are attached to respective ends of the longitudinal members 14. The members 18a, 18b extend outboard from the longitudinal members 14 and are disengageably secured together at the longitudinal centerline L of the skid 10 by a bolt and bracket assembly 20 which is more fully described below. When joined together, the members 18a, 18b form a transverse support member 18 which can be similar to the unitary transverse member 16 in shape and size, and substantially equal in length. Thus, the members 18a and 18b are square in section (see FIG. 4) and have upper sides flush with the upper surfaces of the longitudinal members 14.

Referring to FIG. 1, each longitudinal support member 14 is comprised of three interfitted segments, 14a, 14b and 14c. The forward end skid section 12a includes two longitudinal segments 14a, the middle skid section 12b includes two longitudinal segments 14b, and the rear end skid section 12c includes two longitudinal segments 14c. The segments 14a, 14b and 14c are secured together in endwise longitudinal alignment by additional bolt and bracket assemblies 20.

Each of the interlockable skid sections 12a, 12b, 12c is also provided with transverse bracing members 22 near the bolt and bracket assemblies 20. As illustrated, the middle skid section 12b has two bracing members 22, and the rear end skid section 12c has one bracing member 22. The forward end skid section 12a has a two-piece bracing member 22 formed by members 22a and 22b which are joined at the longitudinal centerline of the skid 10 by another bolt and bracket assembly 20.

The actual member of bracing members used, of course, can be increased to provide additional support for longer skids. However, for most purposes, four braces are adequate. Any braces used in the end skid section 12a, however, must have the two-piece construction in order to permit the section 12a to be broken down into two transverse halves, as will be further described below.

As shown in FIG. 1, certain ends of the interfitted, longitudinal segments 14 are provided with extended male ends 24 which slidably insert into open ends of an adjacent longitudinal segment in a sleeve-like manner and, with the assemblies 20, form or provide an interlocking arrangement for the skid sections 12a, 12b, 12c. As illustrated, each male end 24 is a rectangular extension similar in section to the segments 14 except with slightly reduced height and width dimensions to permit the respective male end 24 to slide into an adjacent segment 14 opening.

With the use of three interlockable skid sections 12a, 12b, and 12c as illustrated in the drawings, there are a minimum of four mated male ends 24. As shown, the middle skid section 12b is provided with three of the male ends 24 and the fourth is provided on one of the longitudinal segments 14c of the end skid section 12c. Of course, all four male ends can be provided on the middle section 12b or the male ends can be provided on the adjacent sections 12a, 12c or a combination thereof (as illustrated in the preferred embodiment).

The bolt and bracket assemblies 20 can all be of similar construction to achieve a disengageable connection. Referring to FIG. 4, a pair of brackets 26 are mounted on adjacent ends of two sections to be separably joined together, such as the longitudinal member segments 14 or the transverse members 18a, 18b or 22a, 22b. Each bracket 26 can be attached to its associated member by any convenient means, such as welding. The brackets 26 are provided with aligned holes through which threaded bolts 28 can be inserted. A mated nut 30 cooperates with the bolt 28 to hold the associated brackets together. Preferably, the bolt and bracket assemblies 20 are mounted on the outer sides of the joined members to facilitate assembly and disassembly of the skid 10. The only exception is the assembly 20 used to secure the bracing members 22a and 22b together. The assembly 20 in such case is preferably attached so as to face the end members 18a, 18b. The bracing members 22a, 22b are conveniently positioned under an operator's platform 64 (FIG. 6) so that the associated assembly 20 can be easily reached.

The interlockable end skid section designated 12a at one end of the skid 10 is designed so that it can be further broken down into two transverse halves or subsections 33a, 33b without having to disassemble other portions of the skid 10. The divisible end section 12a has no unitary transverse member which is attached to both of the longitudinal segments 14a. Thus, even though the section 12a is conveniently and adequately transversely braced, the transverse members are all separable at the longitudinal centerline of the skid 10. This is accomplished by means of the bolt and bracket assemblies 20 as just described.

A plurality of outwardly extending cantileverlike support members 32 are provided with the end skid section 12a. Each member 32 is fixedly attached to only one of the longitudinal members 14, such as by welding. The longer members 32a (see FIG. 2) lie in the same plane as the members 14 and rest on the supporting foundation with an upper side 34a flush with the upper surface of the associated member 14 to which it is attached. The shorter support members 32b (see FIG. 3) have an upper side 34b raised above the upper surface of the longitudinal members 14. A third type of support arm or member 36 having an upper side 34c is mounted to each end member 18a, 18b with a pair of upright plates 38 (see FIG. 5).

As will be described in more detail, the triple support members 32a, 32b and 36 act as supports for mounting engines and transmissions on the skid 10.

The middle and rear end skid sections 12b, 12c also include a plurality of machinery cross-support arms or members 40; however, these members can be fixedly attached to both longitudinal members 14 since the sections 12b, 12c are not intended to be laterally separated into halves in normal use. As illustrated, the cross-supports 40 may also be angled with respect to the longitudinal members 14 to achieve the desired support for the particular machinery to be mounted thereon.

The skid frame 10 illustrated in FIGS. 1–5 is especially suited for mounting certain machinery associated with cement pumping apparatus. Such apparatus typically includes a plurality of engines, transmissions driven by the engines, pumps, and a displacement tank. While the specific machinery used does not constitute any part of the present invention, the invention does contemplate an improved layout of the machinery in combination with the described skid frame with a substantial improvement in maintainability, manufacturability and operator efficiency.

Figure 6:
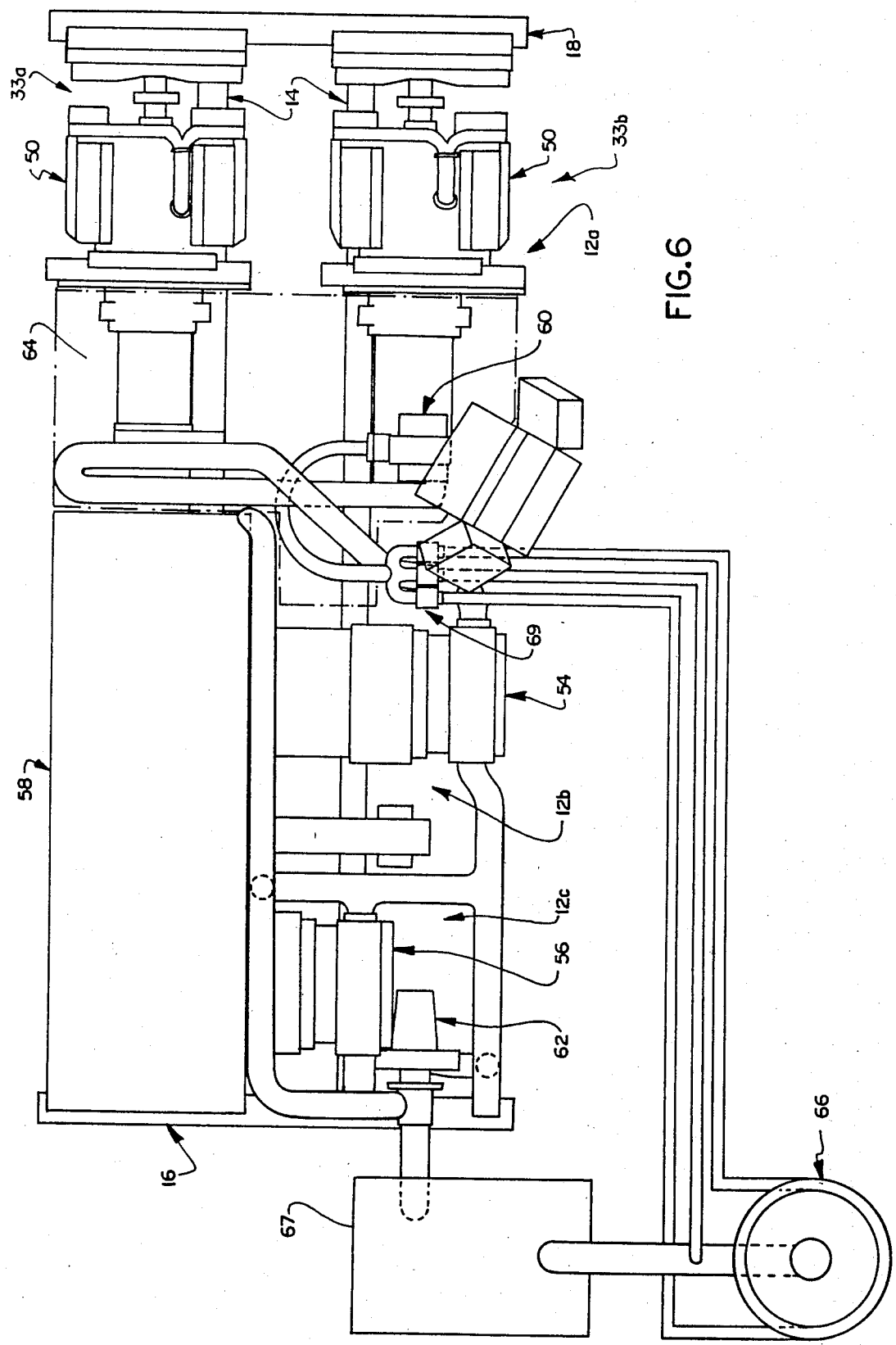
FIG. 6 is a plan view of the skid frame shown in FIG. 1 with cement pumping machinery mounted thereon in a preferred arrangement.

Turning to FIG. 6, a preferred arrangement is shown for mounting oil field pumping machinery on the modular skid frame 10. The skid itself is not intended to support related mixing equipment but, rather, to support the associated pumping machinery used in connection with an off-skid mixing system. This permits a greater utility and adaptability by not limiting the skid and the machinery thereon to any one particular mixing system.

The skid 10 is designed to support two engines 50 as illustrated. The engine support members 32a, 32b and 36 (FIGS. 1 and 4) are appropriately sized and arranged to fully support the engines 50 and the associated transmissions and drive trains 52. In particular, the upper sides 34a, 34b and 34c (FIGS. 2, 3, 5) engage with the engines and transmissions to support the same. One engine and associated transmission is mounted on each separable half of the forward skid section 12a. This arrangement greatly facilitates repair and/or replacement of either of the engines while leaving the other engine and the rest of the skid intact. The middle skid section 12b is adapted to support one of two positive displacement pump modules 54 (generally triplex pumps) while the other positive displacement pump 56 is mounted on the rear skid section 12c. The displacement tank 58 is mounted lengthwise over the power ends of the pumps and spans two of the skid sections 12b and 12c. Thus, removal of the tank 58 is necessary prior to removal of the pumps 54, 56.

A low pressure centrifugal mixing pump 60 is conveniently mounted on top of one of the engine transmissions and a pressurizing pump 62 is mounted on the rear skid section 12c as illustrated. For clarity, associated hardware such as hoses, filters, drive systems, fasteners, piping systems, fuel systems, controls and instruments are not shown, as they are well known in the art and do not constitute any part of the invention. An operator's platform having the associated controls is generally indicated by the numeral 64 and can be conveniently located between the engines and the displacement tank to maximize operator efficiency.

FIG. 6 also shows schematically a standard low/high jet mixer 66 positioned off-skid. When the illustrated skid unit is used to pump an oil field cement slurry, the mixing tub 67 is placed near the pressurizing pump 62 as illustrated. The pressurizing pump supplies slurry to either positive displacement pump but does not recirculate slurry. Water is supplied and metered from the mixing pump 60 through a discharge jet manifold 69. The low-pressure jet mixer uses the centrifugal pump 60 to supply water, while the high-pressure jet mixer uses the second positive displacement pump to supply water.

Because the mixing systems are located off-skid, the modular skid 10 and associated pumping machinery can be used with several different kinds of mixing systems. For example, although not illustrated in the drawings, other than the standard low/high pressure jet mixer, the pumping skid can alternatively be used in combination with a tornado mixer. In such case the pressurizing pump 62 recirculates slurry back to the mixer volute inlet and also pressurizes the positive displacement pumps. Mixing water is supplied by the centrifugal pump 60.

Another type of mixing system which can be used is a self-powered recirculating cement mixer which has a slurry pressurizing pump supplied integral with the mixer. Thus, the pressurizing pump can be bypassed. Another mixer system suitable for use with the pumping skid 10 is a cement mixer which utilizes the pressurizing pump 62 to recirculate slurry to the mixer and pressurized slurry to a triplex pump or other positive displacement pump.

The design of the described modular skid frame 10 greatly improves maintainability of the overall pumping system as it permits the engine section 12a to be removed for repair or replacement of an engine or transmission without necessitating breaking down the entire skid. By having a portion of the engine support members 32a contacting the supporting foundation in addition to the longitudinal members 14, the skid remains stable even when one of the engine support skid subsections 33a, 33b is removed. Furthermore, the skid 10 can be assembled by the use of only six bolt and bracket assemblies 20 due to the interfitting design of the mated longitudinal segments 14. This greatly simplifies the assembly and disassembly of the skid frame.

The modular skid 10 is designed to break down into four interlockable sections as described. With the pumping machinery mounted thereon, the skid assembly is transportable as a complete skid or in five separate sections. These five sections are: the engine and transmission subsections 33a, 33b which, when assembled, form the one end section 12a of the skid; one section 12b for one of the positive displacement pumps 54; one section 12c for the other positive displacement pump 56; and the pressurizing pump 62; and the displacement tank 58 which, when mounted on the skid 10, has one end supported by the middle section 12b and the other end supported by the rear end section 12c. A plurality of hoist links 42 are provided to facilitate lifting of the skid 10 or sections thereof.

Another particular advantage of the skid is that repair or servicing of the engines 50 can be done between the engines because the support members 32a, 32b and 36 do not meet or cross between the longitudinal members 14. Also, the skid subsections 33a, 33b are substantially reduced in size compared to the assembled sections 12a, 12b and 12c, and thus the subsections can easily be passed through relatively small passageways such as, for example, a hold of a ship.

As described, some members such as the longitudinal members 14 and the end members 16, 18 are made of rectangular steel tubing. All open ends are closed off with steel plates 44 to minimize moisture trap and corrosion. Material for construction of the skid frame members is structural grade steel with all continuous seam welds. The overall unit rests on the longitudinal members 14 which are capable of supporting the weight of the unit during shipping, thus eliminating the need for shipping rails.

While the skid frame 10 has been shown and described as requiring six bolt and bracket assemblies 20 to assemble the skid, it should also be clear that instead of three interlocking sections, sections 12a and 12c could be made as one unitary structure, presuming that maximum weight limits for transporting the skid sections are not exceeded. The use of three interlocking sections with four bracing members 22, however, has been found to be the most desirable arrangement.

An alternative embodiment of the present invention is illustrated in FIGS. 7 and 8. Elements in FIGS. 6 and 7 which correspond to elements in FIGS. 1–5 are designated with like reference numerals, followed by a prime (').

As shown in FIG. 7, the skid 10' constitutes three interlockable sections 12a', 12b', and 12c', with interlockable sections 12a' being further separable into two subsections 33a' and 33b'. The modular skid 10' is secured as a unit by the bolt and bracket assemblies 20'. In the embodiment of FIGS. 6 and 7, however, the machinery cross-support arms 40' are mounted transversely to the longitudinal support members 14' and thus lie substantially parallel to the members 31a', 32b', and 36'. As illustrated in FIG. 7, the cross-members 40' lie in a parallel plane above the plane of the longitudinal members 14'.

Furthermore, the bracing member 22' in subsection 12a' extends outboard on each side of the skid 10', as illustrated. This design permits further support for the machinery along the outer periphery of the skid 10'. The bracing member 22' in subsection 12a' comprises two members 22a' and 22b' joined by a bolt and bracket assembly 20', as illustrated. The outer ends of the members 22' can be provided with hoist links 42', as illustrated. The members 32a' are formed of rectangular steel tubing as illustrated rather than the I-beam type structure shown in FIG. 1.

Although the skid frame 10 is particularly adapted as a pumping unit for pumping cement slurries in oil field applications, it is further contemplated that the skid can easily be adapted to perform a variety of other high-pressure pumping services.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. A machinery skid comprising:
a modular frame assembly having first and second longitudinally interlockable sections;
engageable means for securing said sections together, said sections when assembled defining two relatively close longitudinal support members and a plurality of transverse support members, each longitudinal member having at least two segments joinable together in endwise alignment by said securing means, said first interlockable section having certain of said transverse members being fixedly secured to both longitudinal members and extending outwardly therefrom, said second interlockable section having other said transverse members only being fixedly secured to respective ones of said longitudinal members and extending outwardly therefrom, a pair of said other transverse members being positioned on respective free ends of said longitudinal members at one end of said second interlocking section, said pair of transverse members being joinable by said securing means such that one end of the skid is formed by said second interlocking section which can be disassembled from the skid in two laterally separate parts.

2. A skid according to claim 1, further comprising a third longitudinal interlockable section positioned between said first and second sections and disengageably joined thereto by said securing means such that each longitudinal support member includes three of said endwise aligned segments.

3. A skid according to claim 2, wherein the skid has a longitudinal centerline parallel to and intermediate said longitudinal support members.

4. A skid according to claim 3, further comprising a plurality of transverse bracing members joining said longitudinal members, each of said interlockable sections having at least one of said bracing members wherein each bracing member associated with said second section has a two-part structure, each of said second section bracing member parts being fixedly attached to only one respective longitudinal member and the parts being joined by said securing means near the longitudinal centerline of the skid.

5. The skid according to claim 3, wherein said longitudinal support member segments are formed of rectangular tubing and each joined pair of said segments have an interfit design defined by a rigid extension on a respective end of one of said joined segments, said extension having a cross-sectional shape similar to a cross-sectional area smaller than said segment tubing such that said extension is slidably insertable into the other of said joined segments, each joined pair of said segments being disengageably held together by said securing means.

6. A skid according to claim 5, wherein said securing means comprises a plurality of bolt and bracket assemblies, each assembly having two brackets, one each of said brackets being fixedly secured to respective ends of each pair of longitudinal segments or transverse members to be joined, and bolts and cooperating nuts for holding said brackets together such that only six bolt and bracket assemblies are required to assemble the skid frame.

7. A skid according to claim 2, wherein said one end of the skid formed by said second interlocking section supports a plurality of engines thereon, a single engine being located on each respective separable part of said second section whereby each engine and associated section part can be independently removed.

8. A skid according to claim 7, wherein said second section laterally separable parts are symmetrical and substantially mirror images of each other with respect to the longitudinal center axis of the skid.

9. A skid according to claim 8, wherein some of said other transverse members associated with said engine end of the skid have an engine engaging side above an upper surface of said longitudinal support members.

10. A skid according to claim 9, wherein at least one pair of said other transverse members associated with said engine end of the skid are coplanar with said longitudinal members, said pair of coplanar members and said longitudinal members both being in contact with a supporting foundation for the skid.

11. A skid according to claim 10, wherein there is a substantial space between said longitudinal support members and said transverse members on said engine end of the skid.

12. A skid according to claim 7, wherein said second and third interlocking sections each individually support a respective pump, and a displacement tank is supported above said pumps by both said second and third interlockable sections.

13. A skid according to claim 12, wherein said engine end of the skid supports an operator's platform between said engines and said displacement tank.

14. A skid according to claim 13, wherein said pumping equipment is arranged on the skid to facilitate use of the equipment with an off-skid mixing system, said mixing system being located near an end of the skid opposite said engine end so as not to interfere with individual removal of said engine end laterally separable parts.

15. A modular skid for supporting oil field pumping equipment including a plurality of engines, pumps driven by the engines via transmissions and at least one displacement tank, the skid comprising three longitudinally interlockable sections disengageably securable together, said sections when assembled defining a pair of spaced longitudinal support members and a plurality of transverse support members, each longitudinal support member being formed of at least three segments interfitted together in endwise alignment, each of said interlockable sections including a respective one of said segments for each longitudinal member, some of said transverse members being fixedly secured to both longitudinal members and extending substantially outwardly therefrom, other of said transverse members being fixedly secured to respective ones of said longitudinal members and extending outwardly therefrom, one of said three interlockable sections forming one end of the skid when assembled and having two laterally separable subsections.

16. A skid as set forth in claim 15, wherein said skid end has only individual transverse members which are each attached to only a respective one of said longitudinal members, a pair of said individual transverse members being positioned at respective free ends of said longitudinal members and being disengageably joined together in endwise alignment at a longitudinal centerline of the skid thus providing transverse support to said skid one end while permitting either one of said subsections to be individually removed from the skid.

17. A skid as set forth in claim 16, wherein joined members are disengageably held together by bolt and bracket means.

18. A skid as set forth in claim 16, wherein said segments are made of rectangular tubing and adjacent pairs of said endwise aligned longitudinal segments having an interfitting design wherein one of said segments of an adjacent pair has a rigid extension adapted to slide into the adjacent segment in a sleeve-like manner.

19. A skid as set forth in claim 16, wherein said subsections each support an engine and the other interlockable sections each support a pump and one end of a displacement tank.

20. A skid as set forth in claim 19, wherein there is a substantial space between said longitudinal members and transverse members in said one end of the skid whereby sufficient room is available between said engines for repair and maintenance thereof.

* * * * *